United States Patent

Seymour

[11] Patent Number: 5,950,935
[45] Date of Patent: Sep. 14, 1999

[54] TWO SPEED EXPELLER FOR MATERIAL SPREADER

[75] Inventor: Shaun A. Seymour, New Holland, Pa.

[73] Assignee: New Holland North America, Inc., New Holland, Pa.

[21] Appl. No.: 09/009,385

[22] Filed: Jan. 20, 1998

Related U.S. Application Data

[60] Provisional application No. 60/038,486, Feb. 24, 1997.

[51] Int. Cl.[6] .................................................. A01C 19/00
[52] U.S. Cl. .......................... 239/670; 239/684; 239/679
[58] Field of Search ..................................... 222/414, 235, 222/236; 198/672; 239/684, 679, 672, 681, 65 E

[56] References Cited

U.S. PATENT DOCUMENTS

| | | | |
|---|---|---|---|
| 299,648 | 6/1884 | Johnson | 239/679 |
| 2,296,909 | 9/1942 | Dake | 275/2 |
| 3,871,588 | 3/1975 | Long et al. | 239/673 |
| 4,124,166 | 11/1978 | Lucas | 239/662 |
| 4,669,670 | 6/1987 | Linde et al. | 239/660 |
| 4,801,085 | 1/1989 | Fischer | 239/1 |
| 4,993,632 | 2/1991 | Martin | 239/679 X |
| 5,085,372 | 2/1992 | Martin | 239/679 X |
| 5,199,638 | 4/1993 | Fischer | 239/7 |
| 5,221,049 | 6/1993 | Linde et al. | 239/675 |
| 5,275,335 | 1/1994 | Knight et al. | 239/7 |
| 5,386,943 | 2/1995 | Peeters | 239/675 |
| 5,435,494 | 7/1995 | Knight et al. | 239/675 |
| 5,501,404 | 3/1996 | Meyer | 239/679 X |

FOREIGN PATENT DOCUMENTS

| | | | |
|---|---|---|---|
| 495237 | 7/1992 | Germany | 239/682 |
| 1005696 | 3/1983 | U.S.S.R. | 239/682 |
| 663374 | 12/1951 | United Kingdom | 239/682 |

Primary Examiner—Kevin Weldon
Attorney, Agent, or Firm—Frank A. Seemar; Larry W. Miller; J. William Stader

[57] ABSTRACT

A spreader having a main frame, and a tank mounted on the main frame for receiving manure or other fertilizer material. At least one auger is rotatably mounted in the tank for conveying material received in the tank to a discharge area where an opening is provided in the tank. A distribution assembly, also mounted on the main frame, receives material conveyed to the discharge area and expels it from the tank as it is transported over a field. Included in the distribution assembly is an expeller comprising first and second side-by-side rotary slingers mounted in the opening for receiving material conveyed to the discharge area and expelling it outwardly in a generally even distribution pattern.

12 Claims, 4 Drawing Sheets

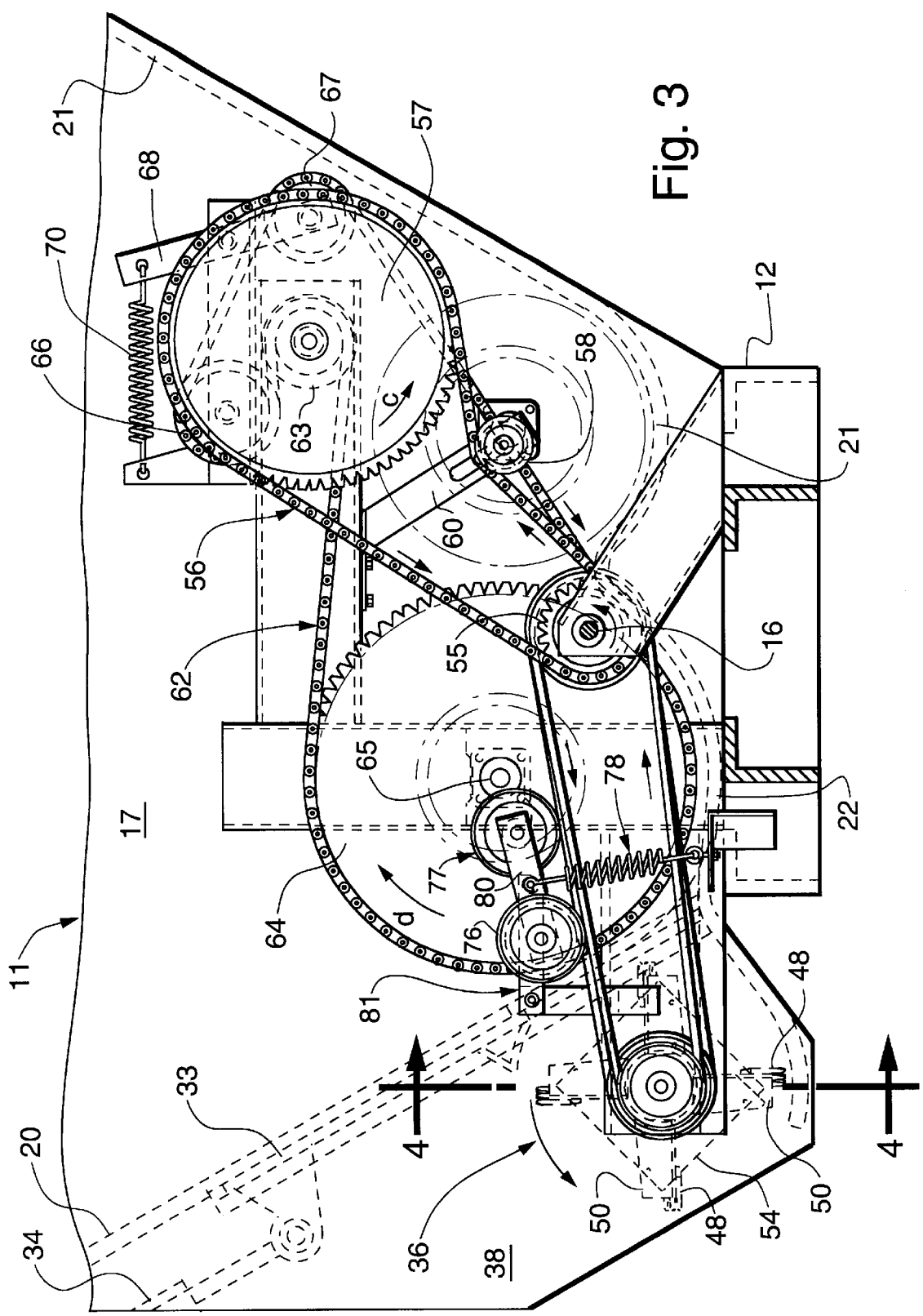

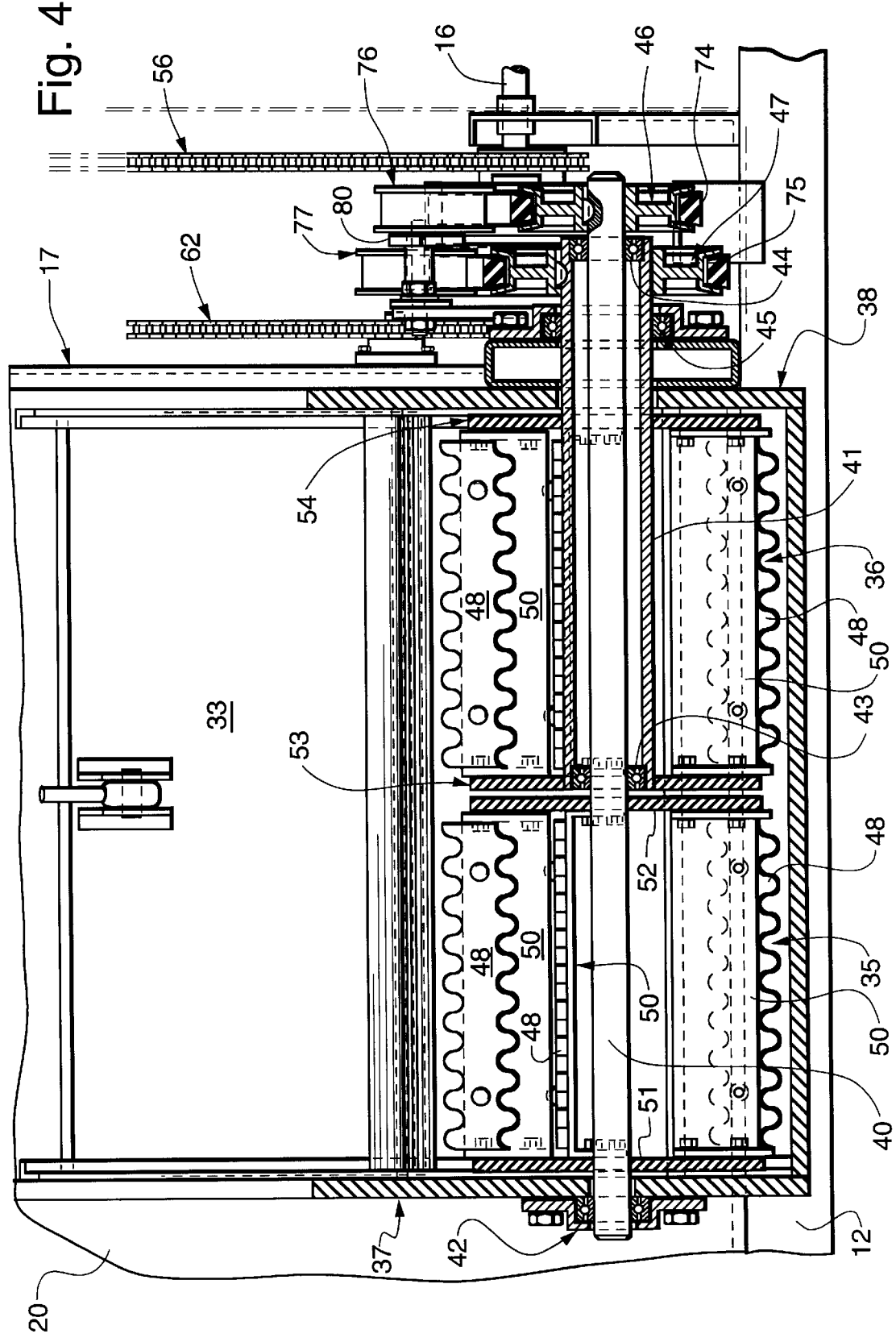

TWO SPEED EXPELLER FOR MATERIAL SPREADER

CROSS REFERENCE TO RELATED APPLICATION

This application claims the benefit of U.S. Provisional Application No. 60/038,486, filed Feb. 24, 1997, and entitled Two Speed Expeller For Material Spreader.

FIELD OF THE INVENTION

The present invention relates generally to material spreaders and more particularly to new apparatus for discharging material from a spreader.

BACKGROUND OF THE INVENTION

There are various types of machines for spreading fertilizer, such as compost, manure, lime, commercial fertilizer, and the like, onto lawns, gardens and fields. One type is commonly referred to as a manure spreader, which as its name implies is used to spread barnyard manure. In a typical farm operation, manure is dispensed in fields for the purpose of conveniently disposing of accumulated manure as well as providing nutrients that enhance the characteristics of the soil in which crops are to be grown. To this end, a variety of manure spreaders have been developed over the years to haul and distribute different types of manure. For instance, conventional box spreaders are preferred for handling dry, clumpy types of manure.

Box spreaders comprise a box-like holding container in which a moveable conveyor is mounted in the bottom for transferring the material to the rear of the container. Rotating beaters, typically paddle shaped, are mounted in a transverse fashion at the rear of the container to engage and break up the material that has been conveyed rearwardly. The paddles also serve to distribute the broken up material in a swath behind the spreader as it is transported across the field.

Even though box spreaders have proven to be effective for dry, clumpy manure, they have not been as effective for distributing manure that has a significant liquid content. One problem is that box spreaders are open at the back, and are not normally sealed, resulting in leakage of the liquid content of the manure as it is being transported to the field, which in many instances is over publicly traveled roadways. To overcome this and other problems encountered with respect to the handling of liquid and semi-liquid manure, spreaders have been developed in which the material is held in a leak proof container.

In one common design the container is a V-shaped tank with inwardly angled sides for guiding material, such as manure, to an auger assembly mounted in the bottom. As manure is loaded into the tank onto the auger assembly, it engages it and conveys it to an expeller assembly for discharge from the tank. This type of spreader, as opposed to a box spreader, is commonly referred to as a tank spreader and is well adapted for handling cattle manure in liquid or slurry form as well as other types of manure with a lesser liquid content, such as swine and poultry manures.

In tank type spreaders, there are various arrangements employing either one or two augers for moving material to a discharge area. A typical example of a single auger machine is shown in U.S. Pat. No. 5,221,049, issued Jun. 22, 1993 in the name of Gilbert W. Linde, et al, while, on the other hand, U.S. Pat. No. 5,386,943, issued Feb. 7, 1995 in the name of a Kenneth J. Peeters, shows a two auger arrangement. In the latter patent a spreader is depicted in which a transverse beater is mounted above the augers to engage material as it is urged rearwardly by the augers to an external transverse beater type expeller.

U.S. Pat. Nos. 5,199,638, issued Apr. 6, 1993 in the name of Thomas R. Fischer, and U.S. Pat. No. 5,275,335, issued Jan. 4, 1994 in the name of Stanley W. Knight, et al, are also directed to dual auger machines. In the spreaders shown in these two patents the augers, rotating in the same direction, are utilized in a cooperative manner to convey material to a side discharge assembly. In the '335 patent one auger is mounted above the other, while in the '638 patent the augers are mounted in a side-by-side fashion at the same elevation, and in both instances feed assist means are provided for conveying the manure to a side delivery discharge area.

Still another dual auger machine representative of the prior art is shown in U.S. Pat. No. 5,435,494, issued Jul. 25, 1995 also in the name of Stanley W. Knight, et al. In the several embodiments of the '494 machine one of the augers is used as a feed auger and the other is used as a discharge auger. The manure is conveyed to discharge means, comprising one or two side delivery assemblies, or an end mounted assembly.

In another prior art arrangement for tank spreaders side discharge is not used. Dual augers convey material to rearwardly located expellers rotated about one or more horizontal axes. Exemplary of this combination are U.S. Pat. No. 3,781,588, issued Mar. 18, 1975 in the name of John B. Long, et al, U.S. Pat. No. 4,124,166, issued Nov. 7, 1978 in the name of Gustave Lucas, and U.S. Pat. No. 4,801,085, issued Jan. 31, 1989 in the name of Thomas R. Fischer.

In yet another arrangement where side discharge is not used, the expeller is mounted to rotate about a vertical axis. Typical of this latter arrangement, is U.S. Pat. No. 5,501,404, issued Mar. 26, 1996 in the name of Donald A. Meyer, et al, which in the principal embodiment shows rotary expeller means with blades extending from a vertical shaft mounted rearwardly and external of the tank. Another example of a vertical expeller arrangement is shown in U.S. Pat. No. 2,296,909, issued Sep. 29, 1942 in the name of Merrills L. Dake, showing a truck mounted spreader used for spreading granulated material, such as salt, sand, or the like. In this spreader the augers, mounted within a flat bottomed tank, are counter rotating to discharge the material through an opening in the back wall of the tank onto distribution discs rotating about vertical shafts.

Notwithstanding the numerous kinds of spreaders available for transporting and discharging material such as manure, a problem commonly encountered, particularly in side delivery spreaders, is uneven discharge. This is especially prevalent in tank type manure spreaders designed to handle slurry material having a high liquid content. Typically the material delivered to the field is more heavily concentrated near the expeller, i.e., in the vicinity of the path of the spreader as it traverses the field on which material is being discharged. An attempt to solve this problem by increasing the speed of the expeller merely tends to shift the entire spread pattern further away from the path of the spreader. The uneven pattern continues to exist, i.e., the heavy concentration is merely further away from the spreader, and thus this arrangement still fails to provide even distribution throughout the pattern.

SUMMARY OF THE INVENTION

The principle object of the present invention is to provide a new and useful solution to the above problem of an uneven distribution pattern of material discharged from a tank spreader.

Another important object is to provide such solution without having a deleterious affect on the overall efficiency and effectiveness of the spreader.

In pursuance of these and other important objects the present invention contemplates improvements to a mobile material spreader having a main frame, ground engaging wheels supporting the main frame, a tank mounted on the main frame for receiving material to be distributed, at least one auger rotatably mounted in the tank for conveying material received in the tank to a discharge area, an opening in the tank in the vicinity of the discharge area, and distribution means mounted on the main frame for receiving material conveyed to the discharge area, the distribution means comprising an expeller assembly for distributing material as the tank is transported over a field. More particularly the improvement comprises an expeller assembly having first and second side-by-side rotary slinger assemblies mounted in the opening for receiving material conveyed to the discharge area, and drive means for rotating the rotary slingers at different speeds to distribute the material at varying distances from the tank to provide a substantially even spread pattern.

The foregoing and other objects, features and advantages of the invention will appear more fully hereinafter from a consideration of the detailed description which follows, in conjunction with the accompanying sheets of drawings wherein the principal embodiment of the present invention is illustrated by way of example. It is to be expressly understood, however, that the drawings are for illustrative purposes and are not to be construed as defining the limits of the invention.

DESCRIPTION OF THE DRAWINGS

FIG. 3 is a cross sectional view taken in the direction of arrows 3—3 in FIG. 1.

FIG. 4 is a cross sectional view taken in the direction of arrows 4—4 in FIG. 3.

DESCRIPTION OF THE INVENTION

Figure 1:
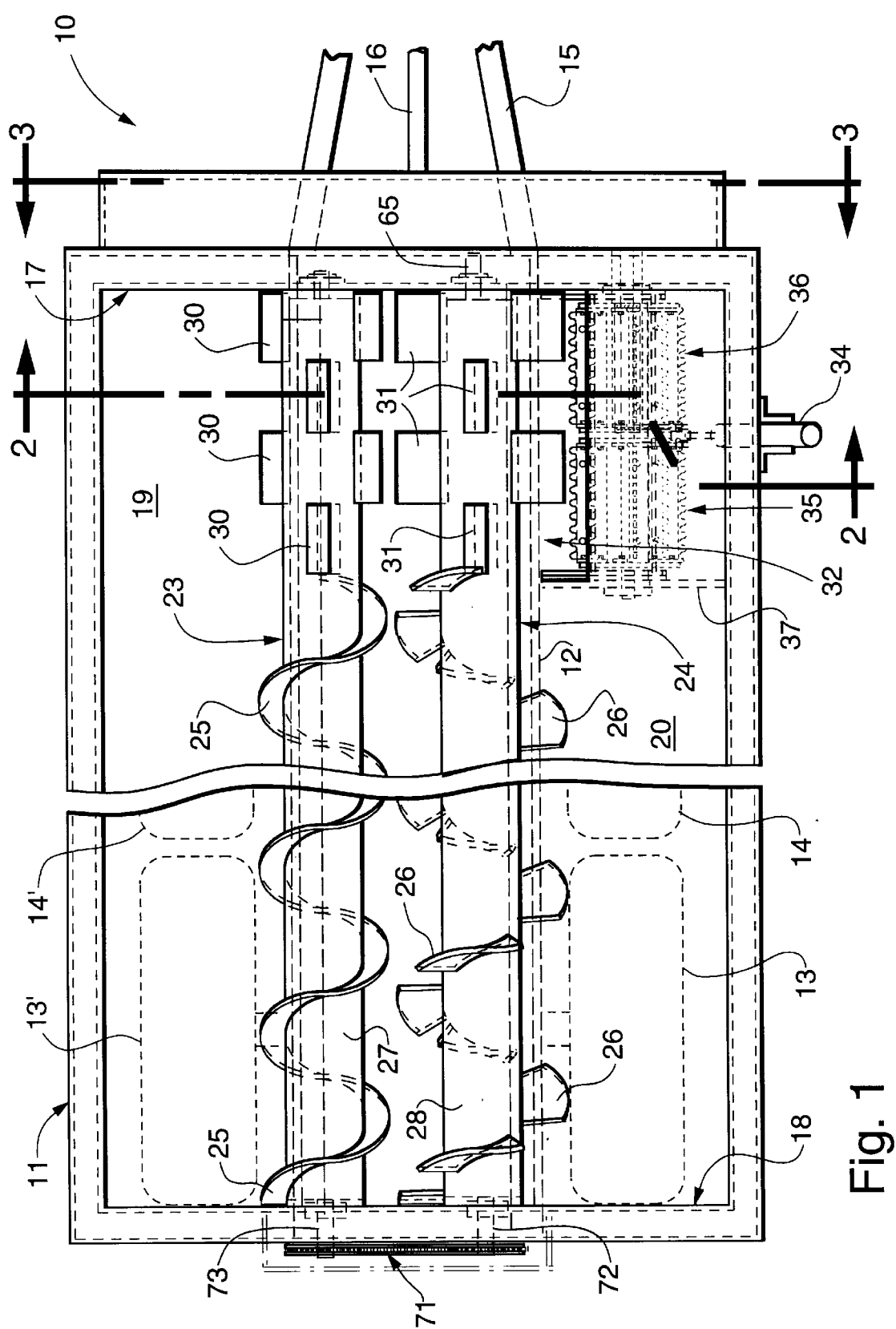
FIG. 1 is a plan view of a manure spreader in which the elements of the present invention are incorporated. The center section of the spreader is cut away for convenience and to illustrate that the dimensions of the spreader have no affect on the invention.

Referring now to the drawings for a more detailed description of the present invention, FIG. 1 shows the plan view of a manure spreader, generally designated by reference numeral 10, in which the elements of the preferred embodiment of the present invention are incorporated. More specifically, spreader 10 includes a tank 11 mounted on a frame 12 supported by a pair of tandem ground engaging wheels 13, 14 on the right side, shown in phantom in FIG. 1, and a like pair of tandemly mounted ground engaging wheels 13', 14' shown in phantom on the left side. For the purpose of this description, all references to the left and right, and front and rear are taken when viewing the spreader from the back, i.e., from left to right in FIG. 1.

During operation a vehicle, such as a tractor, is hitched in towing and driving engagement with the spreader via tongue 15 attached to frame 12. A drive shaft 16 is coupled to the power takeoff (PTO) of the tractor in a conventional manner. Rotative force from the shaft enables mechanical operation of the spreader as discussed below. It should be noted that the invention is also adaptable for operating with other types of supporting and hauling means commonly known in the art, e.g., a large pickup truck.

Tank 11 comprises front wall 17, rear wall 18, a pair of inclined side walls 19, 20, and a bottom comprising a pair of side-by-side, adjacent, arcuate trough-like sections 21, 22 (see FIG. 2) extending along the full length of tank 11. Sections 21, 22 are interconnected by an intermediate raised integral section also running the full length of tank 11. The troughs each provide a smooth transition with side walls 19 and 20.

Mounted immediately above the troughs are a pair of augers 23, 24 having flighting 25, 26, respectively, extending from tubular base elements, 27, 28. The paths of the outer edges of the flighting circumscribes cylinders c1, c2 (FIG. 2) that are accommodated in close adjacency by arcuate troughs 21, 22, respectively, with radii similar to cylinders c1, c2. The augers, journalled in bearing assemblies affixed at the ends of the tank and supported by the main frame, are driven by a chain and sprocket array in a conventional manner (described hereinbelow). The flighting of both augers is rotated in the same direction and at the same speed. The directions of rotation, designated be reference letters a and b, urge material in the bottom of tank 11 in a forward direction, i.e., from left to right in FIG. 1. It should be noted that the principles of the present invention are equally applicable to a spreader wherein the elements are such that material is urged in the opposite direction, i.e., rearwardly.

Figure 2:
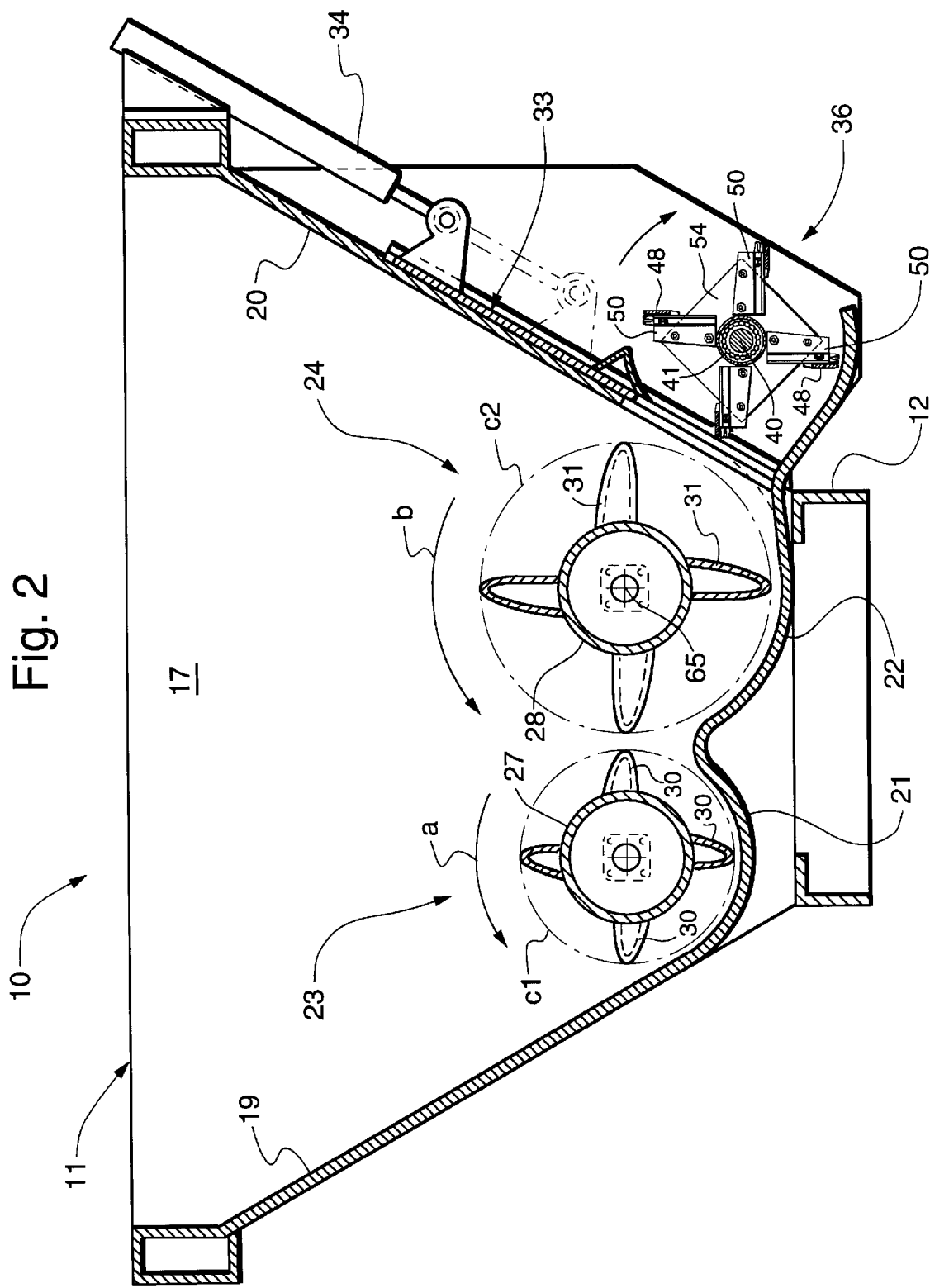
FIG. 2 is a cross sectional view taken in the direction of arrows 2—2 in FIG. 1.

More particularly, referring to FIGS. 1 and 2, flighting 25 is continuous spiral flighting while flighting 26, although disposed along a spiral path, is interrupted or segmented. The diameter of cylindrical path c1 of flighting 25 of auger 23 is less than the diameter of cylindrical path c2 of flighting 26 of auger 24 and thus, the shaft speeds being equal, the peripheral speed of auger 24 is greater than the peripheral speed of auger 23 which fosters the transference of material from auger 23 to auger 24. Completing the auger assembly structure is forwardly located integral sections having a plurality of paddles 30, 31 extending radially from tubular base elements 27, 28 of augers 23, 24 in the vicinity of a forwardly located discharge area (discussed below). The use of paddles enhance lateral conveyance of material in a generally accepted manner. For example, see blades 55 in the dual auger tank spreader disclosed in U.S. Pat. No. 5,199,638 discussed above.

The unique paddle structure used in the instant invention comprises a plurality of generally V-shaped elements extending from each tube with the bight of the V at a distance not to exceed the circumference of the flighting. The blades are set forth in four diametrically opposed staggered pairs along the auger base elements with blades on adjacent base elements aligned. Experimentation has indicated that misalignment of adjacent blades provides for more favorable transfer of material in the discharge area. The offset is changed to adapt to the type of material and the ambient weather conditions.

Provided in the discharge area in the forward vicinity of tank 11 is an opening 32 (see FIG. 1) in the bottom forward portion of side wall 20. The size of opening 32 can be varied by moving door 33. By activating a hydraulic cylinder 34, the position of door 33 can be shifted between the position shown in solid outline to the position shown in phantom outline, at which the tank is completely sealed off for transport.

Directly adjacent opening 32 are a pair of side-by-side expeller assemblies 35, 36 (see FIG. 4) mounted for rotation between expeller walls 37, 38 via coaxial shafts 40, 41. Shaft 40, which extends coaxially with tubular shaft 41, is rotatably mounted in bearing assemblies 42, 43, 44, while shaft 41 is rotatably mounted by a fourth bearing assembly 45 along with bearing assembly 43, which is thereby common to both shafts. Driven sheave 46 rotates shaft 40 at approximately 800 to 900 RPM, while sheave 47 rotates shaft 41 at a lower speed e.g., approximately 600 RPM. Thus, side by side expeller assemblies with associated paddles and teeth are being rotated at different speeds, which is the crux of an important aspect of the present invention.

The expeller paddles, all of which are designated by reference numeral 48, are secured via brackets 50 to first and second pairs of square end plates, 51, 52 and 53, 54. This expeller structure, conventional in nature, is consistent with the structure of U.S. Pat. No. 4,669,670, issued Jun. 2, 1987 in the name of Gilbert W. Linde, et al, the contents of which are hereby incorporated by reference to the extent necessary to describe expellers assemblies 35, 36.

Turning now to the drive assembly shown in FIGS. 3 and 4. Drive shaft 16 rotates small sprocket 55, which engages chain 56 to drive large sprocket 57 in the direction of arrow c. Tension of chain 56 is maintained by adjusting idler roller 58 along the slot in bracket 60 affixed to the frame. Drive chain 62, trained about sprocket 63 which rotates with large sprocket 57, drives drive sprocket 64 in the direction of arrow d to rotate stub shaft 65 (see FIG. 1) to rotate auger 24. Chain 62 is back wrapped around sprocket 66 and idler roller 67, mounted on pivot bracket 68 held under tension by spring 70. At the opposite end of the tank chain 71 drivingly couples stub shaft 72 of auger 24 directly to stub shaft 73 to rotate auger 23 with auger 24.

Sheaves 46, 47, mentioned above, keyed to shafts 40, 41 as shown, are driven by belts 74, 75 trained about side-by-side sheaves rotated by shaft 16. Dual idler tensioning rolls 76, 77 are held against belts 74, 75 by a tension spring 78 coupled to arm 80, mounted on bracket 81 secured to the frame.

In operation the twin auger assemblies rotate at substantially the same shaft speeds to convey material to the discharge area under conditions where spreader 10 is loaded and transported across a field. The split, two-speed expeller engages the material as it is conveyed to the opening and discharges it onto the field. The high speed expeller assembly 35 discharges a portion of the material engaged in a pattern outwardly from opening 32 at a greater distance than adjacent expeller assembly 36 which is rotated at a lesser speed. This results in more even distribution of the material than in the case of conventional expellers, sometimes referred to as slingers, attached to the same shaft and necessarily rotating at the same speed.

Of the many implicit and explicit advantages of the present invention one of the most important is the provision of a tank spreader that distributes efficiently and effectively large amounts of different material over a wide range in a relatively even pattern on the field over which the spreader is being hauled.

While preferred structure in which the principles of the present invention are shown and described in the embodiment set forth above, it is to be understood that the invention is not limited to such preferred structure, but that, in fact, widely different means of varying scope and configuration may be employed in the practice of the invention.

Having thus described the invention, what is claimed is:

1. A mobile material spreader comprising
a main frame,
ground engaging wheels supporting said main frame,
a tank mounted on said main frame for receiving material to be distributed,
at least one auger rotatably mounted in said tank for conveying material received in said tank to a discharge area,
an opening in said tank in the vicinity of said discharge area, and
distribution means mounted on said main frame for receiving material conveyed to said discharge area,
said distribution means comprising an expeller assembly for distributing material as the tank is transported over a field, the improvement comprising
said expeller assembly comprising first and second rotary slinger assemblies mounted in side-by-side fashion in said opening for receiving material conveyed to said discharge area, and
drive means for rotating said first and second rotary slinger assemblies at different speeds to distribute the material at varying distances from the tank to provide a substantially even spread pattern.

2. In an improved mobile material spreader as set forth in claim 1 wherein
said first rotary slinger assembly includes a first shaft, and a first plurality of blades affixed thereto, and
said second rotary slinger assembly includes a second shaft, and a second plurality of blades affixed thereto,
said first and second shafts rotated about a common axis by said drive means.

3. In an improved mobile material spreader as set forth in claim 2 wherein
said first and second shafts are generally parallel to said at least one auger.

4. In an improved mobile material spreader as set forth in claim 2 wherein
the diameter of said first shaft is greater than the diameter of said second shaft.

5. In an improved mobile material spreader as set forth in claim 4 wherein
said first shaft is cylindrical in configuration, and
said second shafts is coaxial with and extends through said first shaft.

6. In an improved mobile material spreader as set forth in claim 5 further comprising
rotatable support means for said second shaft comprising bearing means mounted within said first shaft.

7. A material spreader comprising in combination
a main frame,
a tank mounted on said main frame for receiving material to be distributed,
at least one auger rotatably mounted in said tank for conveying material received in said tank to a discharge area,
an opening in said tank in the vicinity of said discharge area,
distribution means mounted on said main frame for receiving material conveyed to said discharge area,
said distribution means comprising an expeller assembly for distributing material as the tank is transported over a field,
said expeller assembly comprising first and second rotary slinger assemblies mounted in side-by-side fashion in said opening for receiving material conveyed to said discharge area, and drive means for rotating said first and second rotary slinger assemblies at different speeds to distribute the material at varying distances from the tank to provide a substantially even spread pattern.

8. In a material spreader as set forth in claim 7 wherein said first rotary slinger assembly includes a first shaft, and a first plurality of blades affixed thereto, and said second rotary slinger assembly includes a second shaft, and a second plurality of blades affixed thereto, said first and second shafts rotated about a common axis by said drive means.

9. In a material spreader as set forth in claim 8 wherein said first and second shafts are generally parallel to said at least one auger.

10. In a material spreader as set forth in claim 8 wherein the diameter of said first shaft is greater than the diameter of said second shaft.

11. In a material spreader as set forth in claim 10 wherein said first shaft is cylindrical in configuration, and said second shaft is coaxial with and extends through said first shaft.

12. In a material spreader as set forth in claim 11 further comprising rotatable support means for said second shaft comprising bearing means mounted within said first shaft.

\* \* \* \* \*